United States Patent
Kuramatsu (10) Patent No.: US 7,376,412 B2
(45) Date of Patent: May 20, 2008

(54) COMMUNICATION TERMINAL FOR DATA COMMUNICATIONS

(75) Inventor: Hiroyasu Kuramatsu, Tokyo (JP)

(73) Assignee: Nec Corporation, Tokyo (JP)

( * ) Notice: Subject to any disclaimer, the term of this patent is extended or adjusted under 35 U.S.C. 154(b) by 982 days.

(21) Appl. No.: 10/445,801

(22) Filed: May 28, 2003

(65) Prior Publication Data

US 2003/0224763 A1    Dec. 4, 2003

Related U.S. Application Data

(62) Division of application No. 09/657,939, filed on Sep. 8, 2000.

(30) Foreign Application Priority Data

Sep. 21, 1999  (JP) ................... 11-266947

(51) Int. Cl.
*H04M 1/00*    (2006.01)
(52) U.S. Cl. ............... 455/412.2; 455/412.1; 455/566
(58) Field of Classification Search ......... 455/412.2, 455/412.1, 414.1, 417, 456.4, 514, 566–567, 455/422.1
See application file for complete search history.

(56) References Cited

U.S. PATENT DOCUMENTS 6,690,417 B1 *  2/2004  Yoshida et al. .......... 348/231.1

FOREIGN PATENT DOCUMENTS

| JP | 10-49491 | 2/1998 |
|---|---|---|
| JP | 11-112617 | 4/1999 |
| JP | 11-239383 | 8/1999 |

OTHER PUBLICATIONS

Chinese First Office Action (English version), 3 pages.*

* cited by examiner

*Primary Examiner*—Pablo N. Tran
(74) *Attorney, Agent, or Firm*—Sughrue Mion, PLLC (57) ABSTRACT

A communication terminal generates a notification at the completion of data reception according to the amount of data received or a time period for receiving data. A communication system has a communication terminal and a content data server storing data. On request from the communication terminal, the content data server retrieves the data, converts the data such that a predetermined code is included in the data when an amount of the data is larger than a predetermined amount, and transmits the data including the predetermined code to the communication terminal. The communication terminal receives the data including the predetermined code, detects the predetermined code, and generates a notification at the completion of data reception when the predetermined code is detected. In another communication system having a communication terminal and a content data server, the content server transmits data on request from the communication terminal. The communication terminal receives the data and generates a notification at the completion of data received according to a time period for receiving the data.

16 Claims, 10 Drawing Sheets

| COMMUNICATION TYPE A | NOTIFICATION MODE AA |
|---|---|
| COMMUNICATION TYPE B | NOTIFICATION MODE BB |
| ⋮ | ⋮ |
| COMMUNICATION TYPE Z | NOTIFICATION MODE ZZZ |

COMMUNICATION TERMINAL FOR DATA COMMUNICATIONS

This is a divisional of application Ser. No. 09/657,939 filed Sep. 8, 2000; the disclosure of which is incorporated herein by reference.

BACKGROUND OF THE INVENTION

1. Field of the Invention

The present invention relates to a communication terminal. In particular, it relates to a communication terminal suitable for a mobile telephone or a mobile information terminal which performs data communications.

2. Description of the Related Art

Communication terminals have rapidly become pervasive in today's society. The high functionality and miniaturization is achieved by the advancement of communication and packaging technologies. Conventional communication terminals include a mobile telephone in which a voice call can be received, and a mobile information terminal through which various kinds of information content can be browsed over the Internet. In particular, as to the conventional mobile telephone, not only the number of users is increased, but also reliable service has to be provided. For example, various kinds of data communications such as reception/transmission of e-mails and content data browsing have been achieved by access to data communication networks such as the Internet.

On the other hand, it has been predicted that network congestion will rise with the increasing number of users. In addition, the increasing data load due to the increased data quantities required by high-grade service will also clog networks. Consequently, even if communication speed is increased to a certain extent, the conventional communication terminal seems to take more time in data communications.

In the case where desired data is downloaded or target content data is browsed in the conventional communication terminal by accessing the Internet, a user of the conventional communication terminal recognizes completion of data communications by watching for a message indicating the completion of downloading or browsing of the content data that is displayed on a display screen, such as a liquid crystal display (LCD). However, as the time required for the data communications to complete becomes longer, the time when the user must carefully watch the display screen to recognize the completion of the data communications becomes longer as well. Moreover, it is necessary to carefully watch the display screen until the completion of transmission at the time of transmission of data, such as e-mail, from the communication terminal as well as at the time of data reception in the communication terminal.

Furthermore, in the case where a communication charge for the communication terminal is incurred for not a communication data quantity but a line connection time, the user keeps a careful watch on the display screen to end a line connection as soon as the data communication has completed, thereby suppressing extra charges.

In consideration of the characteristics such as portability of the communication terminal, the downloading or browsing operation may be performed when the user is walking or riding in a car. Therefore, it is difficult or dangerous for the user to keep watching the display screen until the completion of the data communications such as downloading or browsing of the content data.

In view of these problems, there have been proposed various techniques relating to conventional communication terminals not requiring that the user thereof to carefully watch the display screen.

Such a conventional communication terminal will be discussed with reference to FIG. 1.

Figure 1:
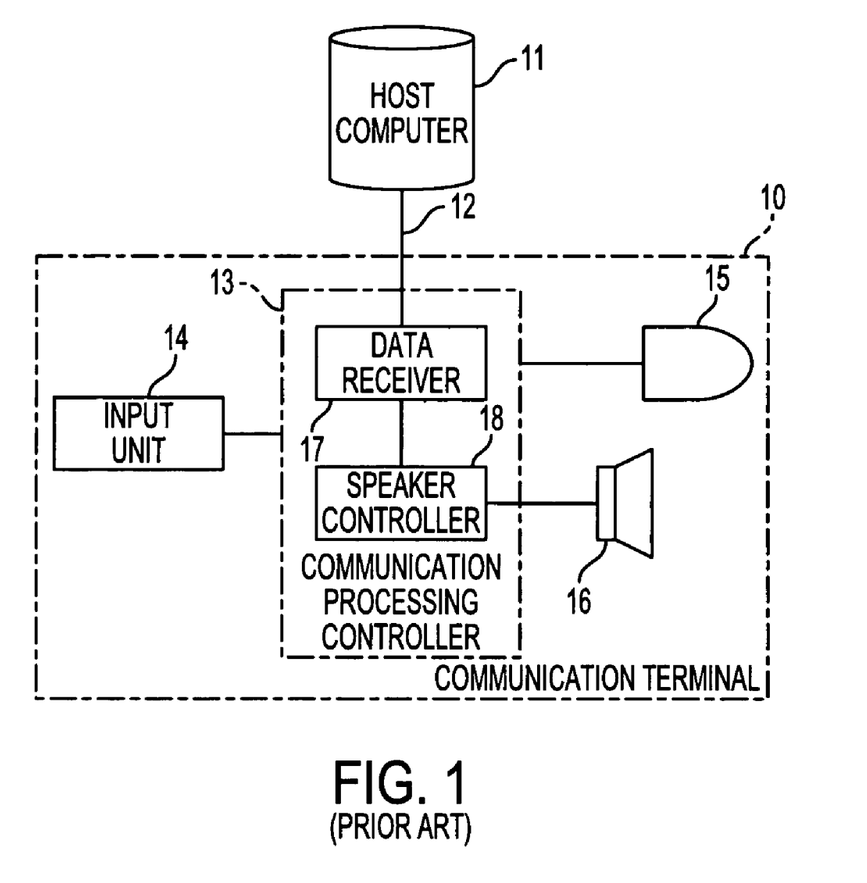
FIG. 1 is a block diagram showing a conventional communication terminal.

Referring to FIG. 1, a conventional communication terminal 10 is connected to a host computer 11 via a communication line 12. The communication terminal 10 includes a communication processing controller 13 for controlling communications with the host computer 11, an input unit 14 for inputting various kinds of instructions to the communication processing controller 13, a display 15, and a speaker 16. The communication processing controller 13 includes a data receiver 17 for receiving data from the host computer 11 via the communication line 12 and a speaker controller 18 for controlling a sound output of the speaker 16.

In the communication terminal 10, data from the host computer 11 is received by the data receiver 17 via the communication line 12 connected to the host computer 11 according to an instruction from the input unit 14. The communication processing controller 13 monitors the data receiver 17 as to whether the data from the host computer 11 has completely received. If the completion of data reception is detected, information indicative of the completion of the data reception is displayed on the display 15. Further, an output sound for giving a notice of the completion of the data reception is output from the speaker 16 under control of the speaker controller 18. Consequently, it is unnecessary for the user to keep a careful watch on the display 15 during the data reception, because the user can recognize the completion of the data reception by the output sound from the speaker 16.

This conventional communication terminal is disclosed in Japanese Patent Application Laid-open No. Hei 10-49491.

However, in the conventional communication terminal, the completion of the data reception is notified by the output sound irrespective of the amount of data received or the elapsed time period of the data reception. In the conventional communication terminal, in most cases, a small amount of data is communicated because of the small display screen. In general, the smaller the amount of data received, the shorter the data receiving period. Therefore, if the notification is performed by the output sound on every data reception, the sound bothers people who may be present around the place at which the communication terminal is used, and further, frequent notifications are undesirable for the user himself. In the conventional communication terminal, the user can preset whether the notification by the output sound is performed. However, if the output sound is preset to not ring for the notification, the data reception cannot be notified by the output sound even if the amount of received data is large.

SUMMARY OF THE INVENTION

It is therefore an object of the present invention to provide a communication terminal capable of suitably notifying a user of completion of a data communication.

In order to achieve the above objects, a communication terminal according to an embodiment of the present invention comprises a receiver that receives data, and a controller that generates a notification at the completion of data reception according to the amount of data received.

Another communication terminal according to an embodiment of the present invention comprises a communication terminal, comprising a receiver that receives data, and a controller that generates a notification at the completion of data reception according to a time period for receiving the data.

In order to achieve the above objects, a method of generating a notification of completion of a data communication, according to an embodiment of the present invention, comprises receiving data, and generating a notification at the completion of data reception according to the amount of data received.

Another method of generating a notification of completion of a data communication, according to an embodiment of the present invention, comprises receiving data, and generating a notification at the completion of data reception according to a time period for receiving the data.

In order to achieve the above objects, a communication apparatus according to an embodiment of the present invention comprises a storage unit that stores data, a communication unit that transmits the data based on request from a communication terminal, and a controller that converts the data such that a predetermined code is included in the data when an amount of the data to be transmitted to the communication terminal is larger than a predetermined amount.

In order to achieve the above objects, a communication system according to an embodiment of the present invention comprises a content data server that comprises a storage unit that stores data, a communication unit that transmits the data based on request from a communication terminal, and a controller that converts the data such that a predetermined code is included in the data when an amount of the data to be transmitted to the communication terminal is larger than a predetermined amount. The communication system further comprises a communication terminal that comprises a receiver that receives the data transmitted from said content data server, a detector that detects the predetermined code included in the data, and a controller that generates a notification at the completion of data reception when the predetermined code is detected by said detector.

Another communication system according to an embodiment of the present invention comprises a content data server that comprises a storage unit that stores data, and a communication unit that transmits the data based on request from a communication terminal. The communication system further comprises a communication terminal that comprises a receiver that receives the data transmitted from the content data server, and a controller that generates a notification at the completion of data reception according to a time period for receiving the data.

In order to achieve the above objects, a method with a content data server and a communication terminal, according to an embodiment of the present invention, comprises requesting data transmission from the communication terminal to the content data server, retrieving data at the content data server according to the request from the communication terminal, converting the data at the content data server such that a predetermined code is included in the data when an amount of the data is larger than a predetermined amount, transmitting the data including the predetermined code from the content data server to the communication terminal, receiving the data including the predetermined code at the communication terminal, detecting the predetermined code at the communication terminal, and generating a notification at the completion of data reception when the predetermined code is detected.

Another method with a content data server and a communication terminal comprises requesting data transmission from the communication terminal to the content data server, retrieving data at the content data server according to the request from the communication terminal, transmitting the data from the content data server to the communication terminal, receiving the data at the communication terminal, and generating a notification at the completion of data reception according to a time period of receiving the data at the communication terminal.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

The preferred embodiments of the present invention will be discussed by referring to the drawings.

(1) First Embodiment

Figure 2A:
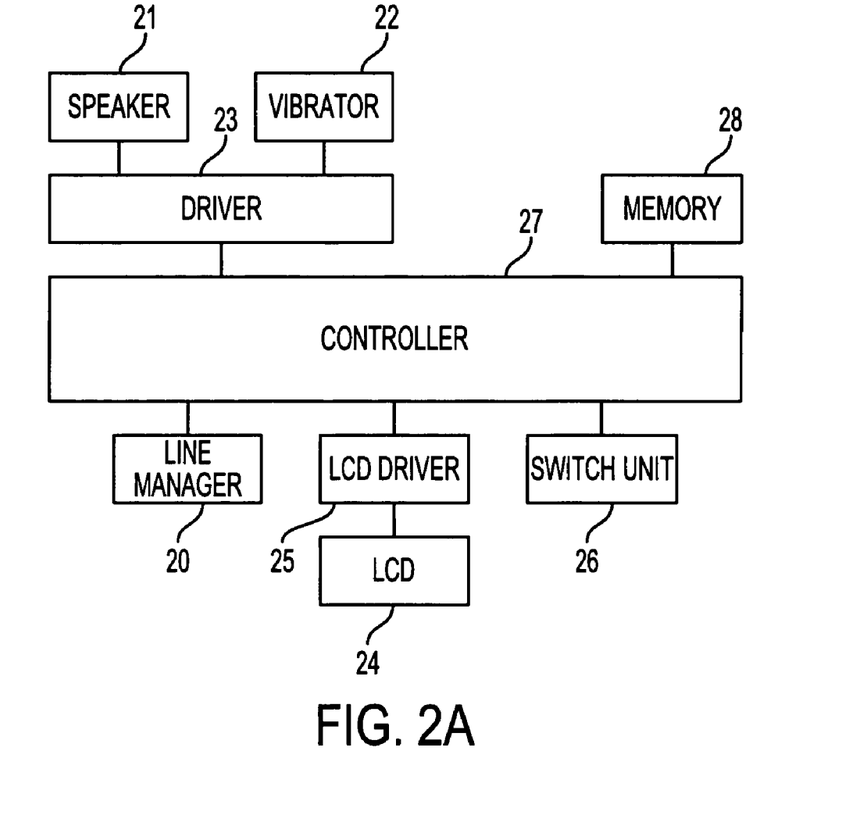
FIG. 2A is a block diagram showing a communication terminal according to a first embodiment of the present invention.

An apparatus relating to notification of completion of data communications in a communication terminal according to a first embodiment of the present is shown in FIG. 2A. The communication terminal according to the first embodiment of the present invention comprises a line manager 20, a speaker 21, a vibrator 22, a driver 23 for activating the speaker 21 and the vibrator 22, a liquid crystal display (LCD) 24, an LCD driver 25 for controlling the LCD, a switch unit 26 for inputting various kinds of instructions, a controller 27 for controlling the communication terminal, and a memory 28 for storing therein control programs for the controller 27 and various kinds of setting information.

The line manager 20 manages line connection, e.g., the connection or disconnection of the communication line with mobile communication networks and data communication networks. The speaker 21 outputs a voice sound output during a speech or a notification sound for notifying an incoming call or completion of a data communication in accordance with an instruction from the controller 27 via the driver 23. The vibrator 22 is vibrated at a predetermined frequency in accordance with an instruction from the controller 27 via the driver 23. The driver 23 sends a control signal to the speaker 21 and/or the vibrator 22 in accordance with various kinds of instructions from the controller 27, to output the voice sound output or the notification sound from the speaker 21 or vibrate the vibrator 22. The LCD 24 displays the operating state of the communication terminal or an operation result by the switch unit 26. The LCD driver 25 sends a control signal to the LCD 24 in accordance with various kinds of display instructions from the controller 27, to display information such as an instructed character or a bit map on the LCD 24. The switch unit 26 includes various switches such as a push button to be operated by a user and other mode setting switches, and detects depression and release of each of the switches.

Figure 2B:
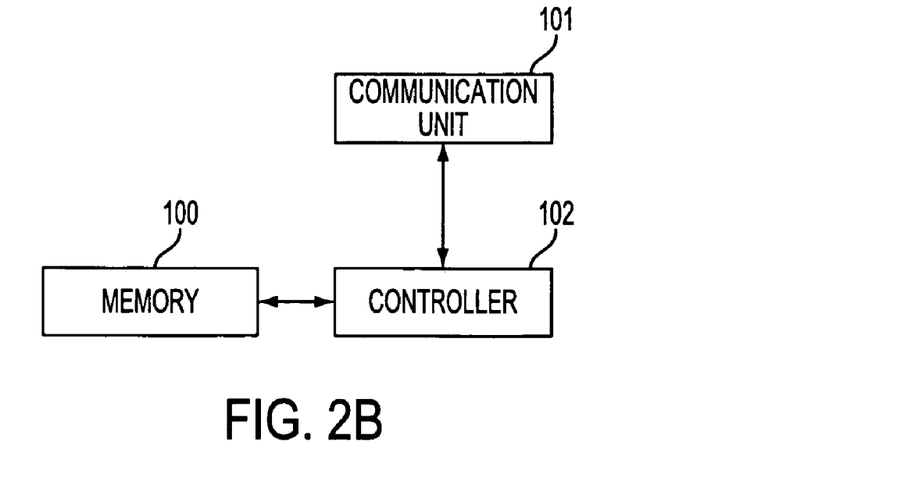
FIG. 2B is a block diagram showing a server according to the first embodiment of the present invention.

The controller 27 executes a browser in accordance with a control program stored in the memory 28, so as to display the content data described in a predetermined information describing language such as a HyperText Markup Language (HTML), a Handheld Device Markup Language (HDML), or a Wireless Markup Language (WML) defined by a Wireless Application Protocol (WAP) system. Content data in one of the above-mentioned formats is received from a server as shown in FIG. 2B on the data communication networks connected via the line manager 20. The controller 27 determines whether or not a predetermined notification code is described in the received content data. The notification code is described in the received content data if notification corresponding to the predetermined notification code is required to notify the user of the completing of the data communication of the received content data. In particular, the predetermined notification code is described in the received content data when an amount of the received content data is larger than a predetermined data amount. When the notification code is described in the received content data, the notification that corresponds to the predetermined notification code is given to the user. Consequently, it is possible to notify the user of the completion of the reception of the content data and/or the completion of display of the received content data.

Referring to FIG. 2B, a server according to a first embodiment of the present invention comprises a memory 100 that stores content data, a communication unit 101 that transmits the content data to the communication terminal and receives a signal from the communication terminal via wireless link (not shown) and/or landline link (not shown), and a controller 102. The controller 102 determines whether an amount of the content data to be transmitted to the communication terminal is larger than a predetermined amount. When the amount of the content data is larger than the predetermined amount, the controller 102 converts the content data stored in the memory 100 such that the predetermined notification code is included in the content data and then transmits the converted content data to the communication terminal through the communication unit 101. Otherwise, the predetermined notification code may be previously described in the content data without any conversion process in the server.

Figure 3A:
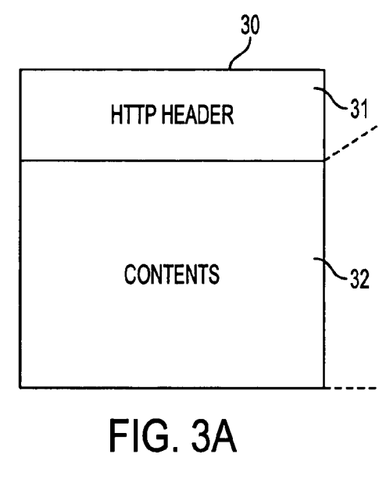
FIGS. 3A and 3B are diagrams showing content data to be received by the communication terminal according to the first embodiment of the present invention.
Figure 3B:
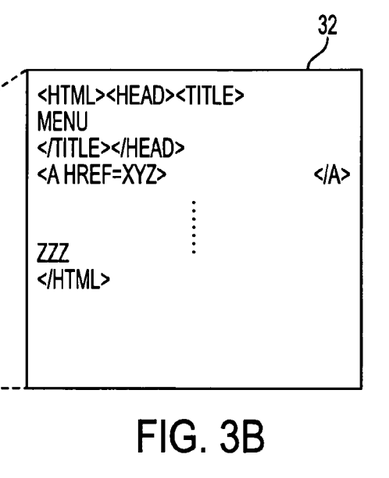

An outline of the content data to be received by the communication terminal is shown in FIGS. 3A and 3B. The outline of the configuration of the content data is shown in FIG. 3A. An example of description in the HTML as an information describing language representing the content data is shown in FIG. 3B. The content data 30 consists of a HyperText Transfer Protocol (HTTP) header 31 and contents 32, as illustrated in FIG. 3A. The HTTP header 31 defines a transfer protocol in the data communication network connected via the line manager 20. In the meantime, the controller 27 executes the browser, so that the contents 32 define information to be displayed on the LCD 24 in a predetermined information describing language such as the HTML.

The information describing language can decorate a character or can designate a layout in accordance with a reserved word code sandwiched between marks "<" and ">" in a text file format. The reserved word code with the marks is called a tag. Such various designations can be made by data located between a first tag wherein a reserved word code is sandwiched between the marks "<" and ">" and a second tag wherein the same reserved word code is sandwiched between marks "</" and ">". For example, in FIG. 3B, the content data are defined or designed by data described between the first tag "<HTML>" and the second tag "</HTML>". A character string "MENU" defined between "<HEAD>" and "</HEAD>" and between "<TITLE>" and "</TITLE>" can be displayed on the LCD 24 as a title. Furthermore, this information describing language is featured in that specific display data can be linked to the content data described in another information describing language. Consequently, data of a large capacity to be linked can be taken in only when it is needed, as long as the displayed content data per se has even the description for displaying. Here, a character string "Internet Service" defined between "<A HREF=XYZ>" and "</A>" is linked to a destination designated by "A HREF=XYZ." Therefore, the content data linked to the character string "Internet Service" can be acquired by selecting the character string "Internet Service." In FIG. 3B, a character string "ZZZ" is described as a predetermined notification code for a data communication completion alert. The character string "ZZZ" is described in the contents 32 as the predetermined notification code if an amount of the content data 30 is larger than a predetermined data amount.

In the controller 27, the tag described as the content data in such information describing language is interpreted by the browser of the communication terminal, to be displayed on the LCD 24. At that time, the controller 27 detects a predetermined notification code described in the content data. The controller 27 notifies the user of a data communication completion alert as an output sound by the speaker 21 and/or vibration by the vibrator 22 when the predetermined notification code is detected. This predetermined notification code is linked directly to the function of generating the output sound by the speaker 21 or the function of generating the vibration by the vibrator 22 at the time of execution of the browser.

The controller 27 includes a central processing unit (not shown), which can perform the above-described control in accordance with the control program stored in the memory 28.

The switch unit 26 is actuated to set various modes of incoming call notification for notifying the user that an incoming call from the mobile communication network is received. The various modes of the incoming call notification, which can be set by the user through the switch unit 26, include a high volume sound, a middle volume sound, a low volume sound, a stepwise volume sound wherein the volume of the speaker's sound is stepwise increased with a lapse of time, no sound, and vibration by the vibrator 22. The user can selectively set at least one mode for the incoming call notification. The set modes are stored in the memory 28 as incoming call notification information. Similarly, the user sets at least one of the notification modes for a data communication completion alert. The set mode is also stored in the memory 28 as data communication completion alert information. Moreover, the user can set allowance or prohibition of the alert at the time of the completion of the data communications by the operation of the switch unit 26. This set operation mode also are stored in the memory 28 as alert setting information.

Figure 4:
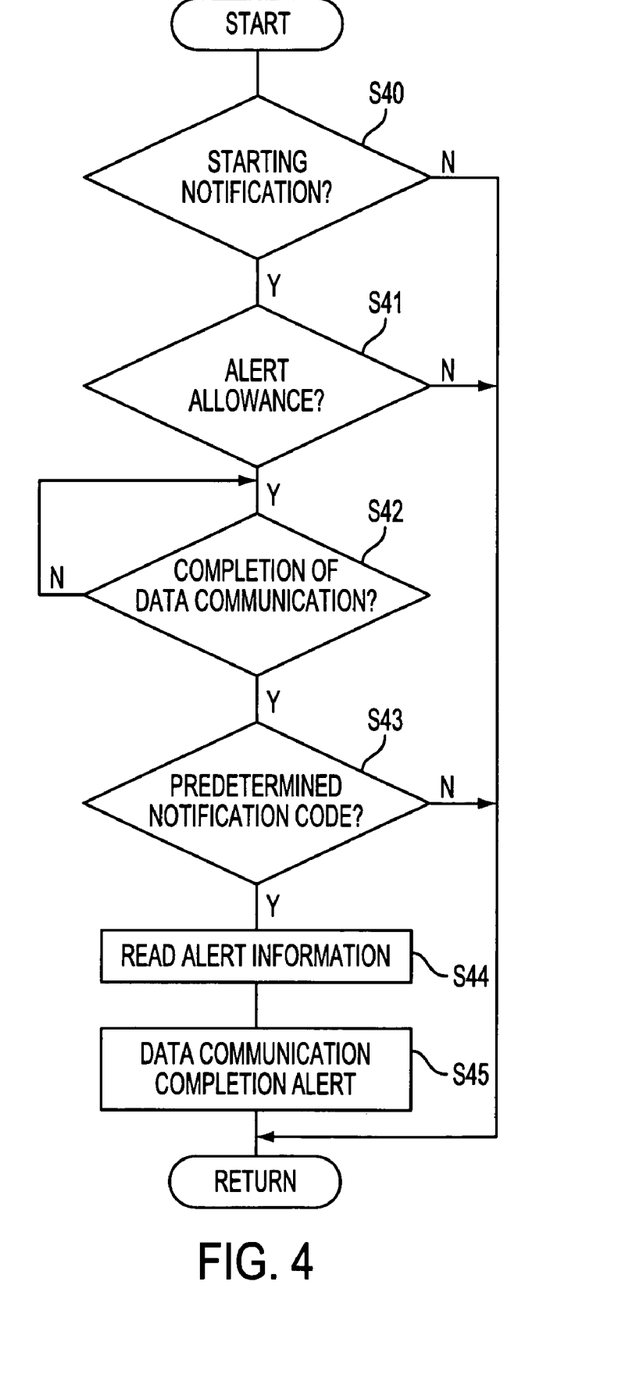
FIG. 4 is a flowchart illustrating an operation of the communication terminal according to the first embodiment of the present invention.

A flowchart illustrating an outline of an operation by the controller 27 is shown in FIG. 4. The controller 27 monitors a starting notification of data communications via the communication line connected to a server as shown in FIG. 2B on data communication networks (step S40: N). Content data to be communicated are stored in the server as shown in FIG. 2B. The starting notification is generated from the line manager 20. When the starting notification is detected by the controller 27 (step S40: Y), it is determined whether a generation of a data communication completion alert is allowed upon the completion of the data communications in reference to the alert setting information previously stored in the memory 28 (step S41). When it is determined that the generation of the alert is prohibited upon the completion of the data communications in reference to the alert setting information (step S41: N), another starting notification of data communication from the line manager 20 is monitored again (Return).

When it is determined in step S41 that the generation of the alert is allowed upon the completion of the data communications (step S41: Y), the completion notification of the data communications in which the starting notification is performed via the line manager 20 in step S40 is monitored (step S42: N). When the completion notification is detected (step S42: Y), the controller 27 has acquired content data which the line manager 20 received from the server over the data communication networks.

The content data received from the server is text data or binary data. The controller 27 executes a browser program stored in the memory 28 without converting the content data when the acquired content data is text data, so as to display the content data on the LCD 24 via the LCD driver 25. A predetermined notification code for the data communication completion alert is previously described in the content data in the above-mentioned conditions. The controller 27 determines the existence of the notification code (step S43).

On the other hand, when the content data is binary data, the controller 27 converts the content data into content data in a text format described in the HTML. In this manner, the content data is received as the binary data, thereby enhancing band-utilizing efficiency, which is thus suitable for a communication line in a narrow band such as a mobile communication network. The controller 27 executes the browser program stored in the memory 28 to display the content data in the converted text format on the LCD 24 via the LCD driver 25. At that time, the predetermined notification code for the data communication completion alert is previously described in the content data in the above-mentioned conditions. The controller 27 determines the existence of the notification code (step S43).

When it is determined in step S43 that there is no notification code (step S43: N), the sequence returns to step S40, in which another starting notification of data communication from the line manager 20 is monitored again (Return). In the meantime, when it is determined that there is a predetermined notification code for the data communication completion alert (step S43: Y), the data communication completion alert information previously stored in the memory 28 is read (step S44). And then, the data communication completion is notified according to the data communication completion alert information indicative of the set notification mode previously set by the user (step S45). Thereafter, another starting notification of data communication from the line manager 20 is monitored again (Return).

Specific operation of the communication terminal according to the first embodiment of the present invention will be discussed in reference to FIGS. 5A to 5D.

Figure 5A:
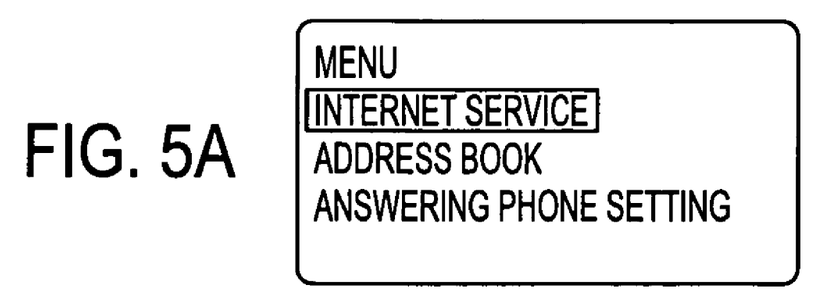
FIGS. 5A to 5D illustrate examples of display screen images of the communication terminal according to the first embodiment of the present invention.
Figure 5B:
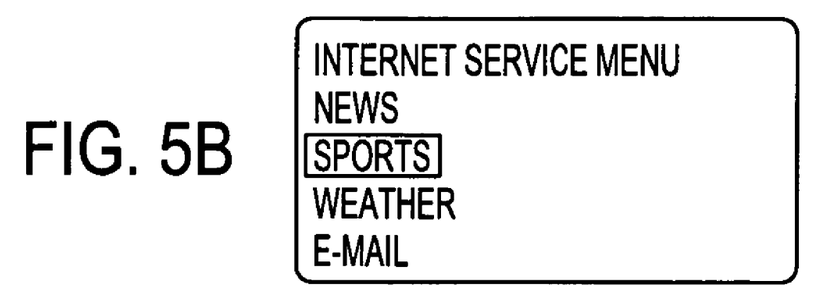
Figure 5C:
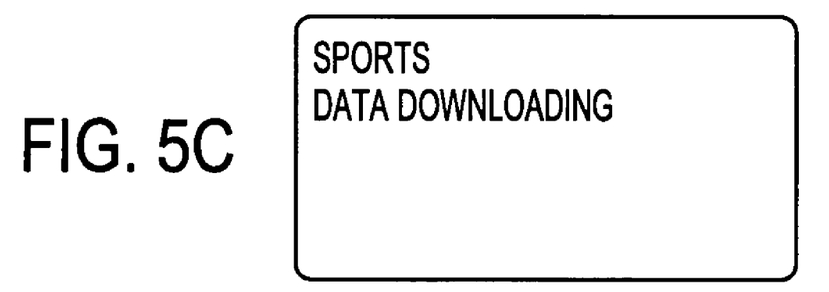
Figure 5D:
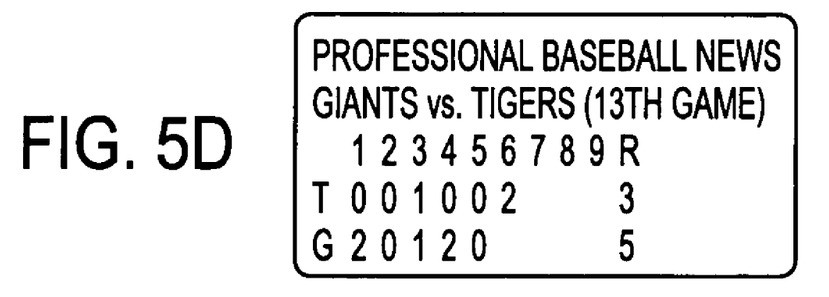

A menu screen image for selecting an access to the Internet service as the data communication network is shown in FIG. 5A. A menu screen image for selecting content data to be received is shown in FIG. 5B. A display screen image in which the selected content data is being received is shown in FIG. 5C. A display screen image of the received content data is shown in FIG. 5D. The communication terminal is equipped with the functions of Internet access, an address book, and a phone-answering setting in addition to the conventional telephone function over the mobile communication network as shown in FIG. 5A. These functions are described in the information describing language such as the HTML previously stored in the memory 28, and can be set on the menu screen displayed on the LCD 24 via the browser. Each of selection items is linked to content data described on a menu screen displayed at the time of selection. Consequently, when the user selects the Internet service through a switch operation by the switch unit 26, as illustrated in FIG. 5A, the content data linked in the information describing language are displayed. In this case, the display result is illustrated in FIG. 5B. Here, when the user selects data relating to sports as shown in FIG. 5B, the communication terminal is connected to the Internet via the line manager 20. At this time, the controller 27 allows the LCD 24 to display thereon "data downloading," as illustrated in FIG. 5C, thereby notifying the user that the data is being acquired.

The line manager 20 connects the communication terminal to the server on the Internet, storing therein content data including desired sports data, and further, notifies the controller 27 of the starting of data communications. Here, assuming that the user previously allows a data communication completion alert to be set, the controller 27 monitors data communication completion notification representing the reception completion of the content data in the text format including the sports data on the server from the line manager 20. Upon detection of the data communication completion notification, the controller 27 displays the content data received by the browser on the LCD 24, and further, determines whether or not there is a predetermined notification code for a data communication completion alert in the received content data.

Here, it is assumed that the user previously sets the notification mode for the data communication completion alert such that the output sound of a high volume is rung twice. When it is determined that there is the predetermined notification code in the content data to be displayed, the output sound with the high volume is rung only twice by the speaker 21, thereby notifying the user of the data communication completion, and further, the received content data is displayed on the LCD 24, as illustrated in FIG. 5D. Otherwise, it is assumed that the user sets a vibration mode for 1 second as the notification mode for the data communication completion alert. When it is determined that there is the predetermined notification code in the content data to be displayed, the vibrator 22 is vibrated for only 1 second, thereby notifying the user of the data communication completion, and further, the received content data is displayed on the LCD 24, as illustrated in FIG. 5D.

In the communication terminal according to the first embodiment of the present invention, the user previously sets the notification mode that is notified as the data communication completion alert. The line manager 20 starts the data communications, and retrieves the received content data. It is determined whether the predetermined notification code for the data communication completion alert is included in the received content data. If it is determined that there is the predetermined notification code, the user is notified of the data communication completion alert in the previously set notification mode. Consequently, since the data communication completion alert to the user is controlled in accordance with the received content data, it is unnecessary to carefully watch the display screen until the completion of the data communications, and further, it is possible to prevent any generation of frequent alerts caused by too short time period data communications. Additionally, since the user can previously set the allowance or prohibition of the data communication completion alert, it is possible to prevent any generation of the data communication completion alert according to the use environment of the user who uses the communication terminal even if the notification code for the data communication completion alert is included in the content data content data, thus providing the communication terminal with more flexibility.

Although in the communication terminal according to the first embodiment the data communication completion alert is generated based on the predetermined notification code, the data communication completion alert may be readily notified upon each data communication completion, like in the conventional communication terminal, by using a tag "</HTML>" as the predetermined notification code. Here, the tag "</HTML>" is an HTML ending tag in the case of the received content data described in the HTML. Similarly, the data communication completion alert may be readily notified upon each data communication completion, like in the conventional communication terminal, by using a tag "</wml>" as the predetermined notification code. Here, the tag "</wml>" is a WML ending tag in the case of the content data described in the WML. That is, because these tags "</HTML>" and "</wml>" are always described in the content data in the HTML and WML protocols, respectively, the data communication completion alert can be performed for each data communication completion by detecting these tags.

Figure 9:
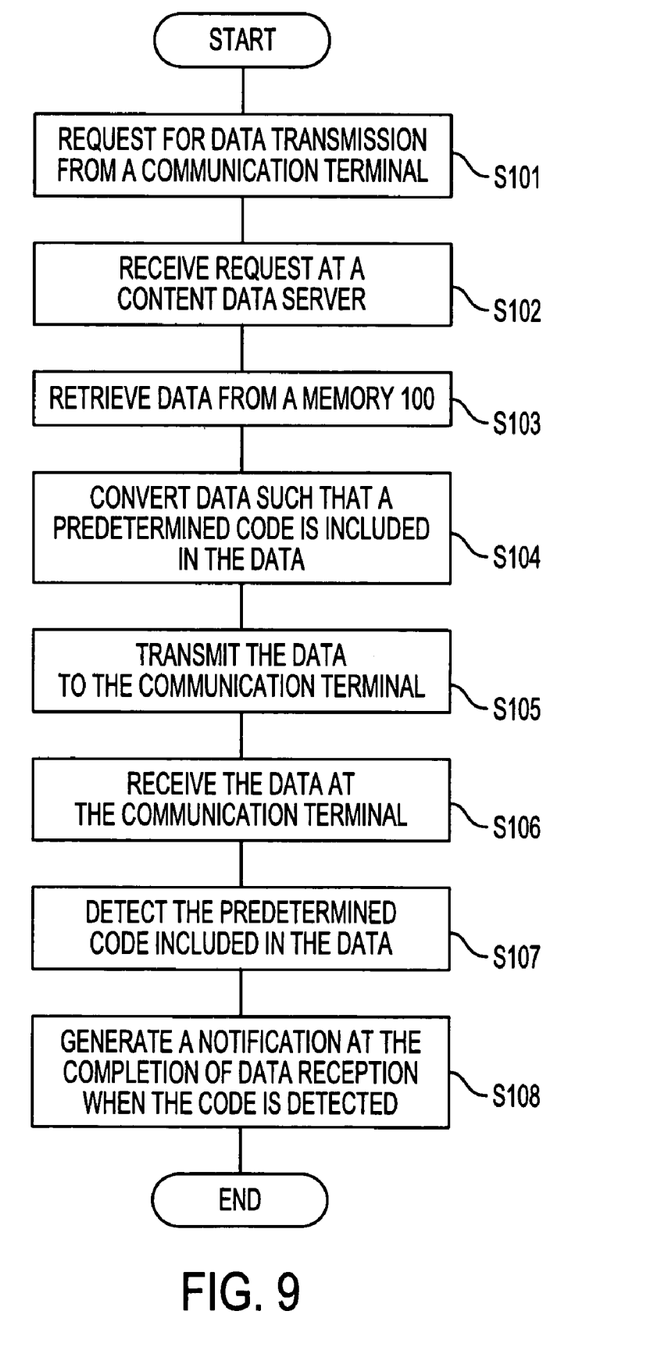
FIG. 9 is a flowchart showing an operation of a communication system with a communication terminal shown in FIG. 2A and a server shown in FIG. 2B according to the first embodiment of the present invention.

Next, an operation of communication systems with a communication terminal shown in FIG. 2A and a server shown in FIG. 2B will be discussed with reference to FIG. 9.

The communication terminal transmits a request signal to the server to transmit data (S101). When the request signal is received by the server via the communication unit 101 (S102), the server retrieves data from the memory 100 (S103) and converts the data such that a predetermined code is included in the data if an amount of the data is larger than a predetermined amount (S104). The server transmits the data including the predetermined code to the communication terminal (S105). The communication terminal receives the data including the predetermined code (S106) and detects the predetermined code (S107). When the predetermined code is detected, the communication terminal generates a notification at the completion of data reception (S108).

(2) Second Embodiment

In a communication terminal according to a second embodiment of the present invention, it is determined that a data communication completion alert is generated according to a time period of data communication. Therefore, measurement of a data communication time period can dispense with not only a change of the content data but also notification code detection during execution of a browser.

Figure 6:
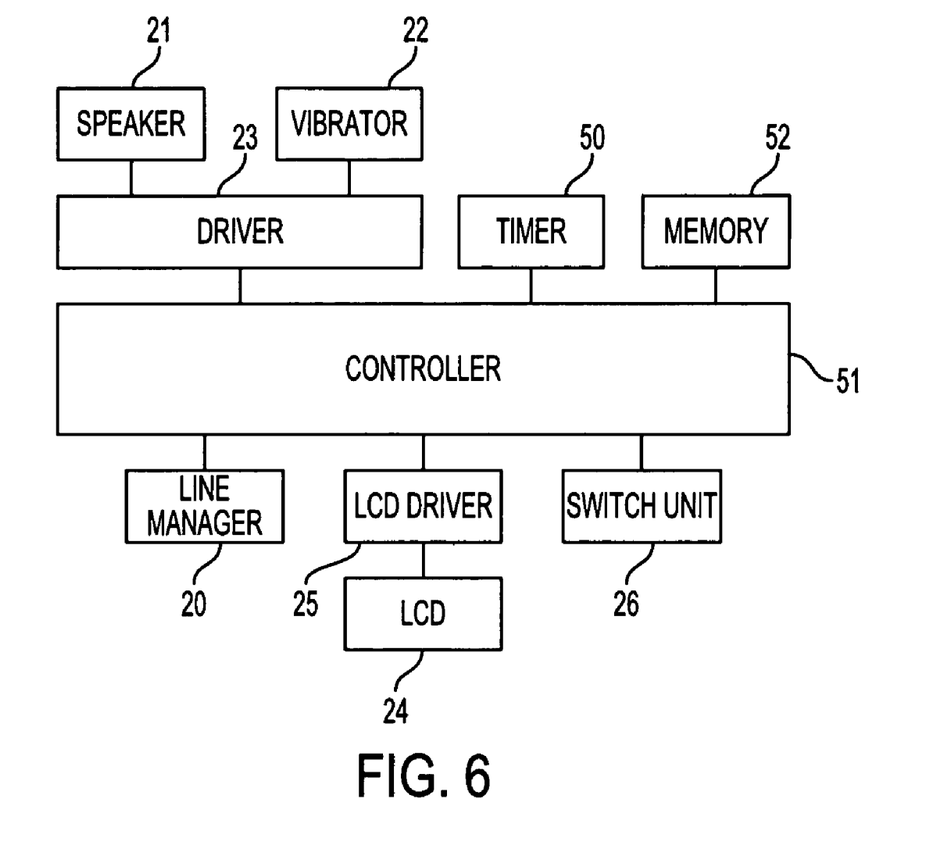
FIG. 6 is a block diagram showing a communication terminal according to a second embodiment of the present invention.

A communication terminal according to a second embodiment of the present invention will be discussed with reference to FIG. 6. Here, the same component parts as those of the communication terminal according to the first embodiment are designated by the same reference numerals, and therefore, the explanation thereof will be omitted. The communication terminal according to the second embodiment comprises a line manager 20, a speaker 21, a vibrator 22, a driver 23 for activating the speaker 21 and the vibrator 22, an LCD 24, an LCD driver 25 for activating the LCD, a switch unit 26, a timer 50, a controller 51 for controlling component parts in the communication terminal, and a memory 52 for storing therein control programs for the controller 51 and various kinds of setting information.

The communication terminal according to the second embodiment is featured by comprising the timer 50 for generating a data communication completion alert according to a measured data communication time period. Thus, even in the case of a small data communication quantity or in case of network congestion due to some circumstances, the completion of the data communications is notified after the data communications for a predetermined time period. Furthermore, it is possible to prevent any generation of an alert in the case of a data communication time period during which it is unnecessary to keep a careful watch on a display screen. Consequently, it is unnecessary to describe a predetermined notification code in content data, unlike in the first embodiment of the present invention.

The controller 51 includes a CPU (not shown) which can perform the above-described control in accordance with a control program stored in the memory 52.

Figure 7:
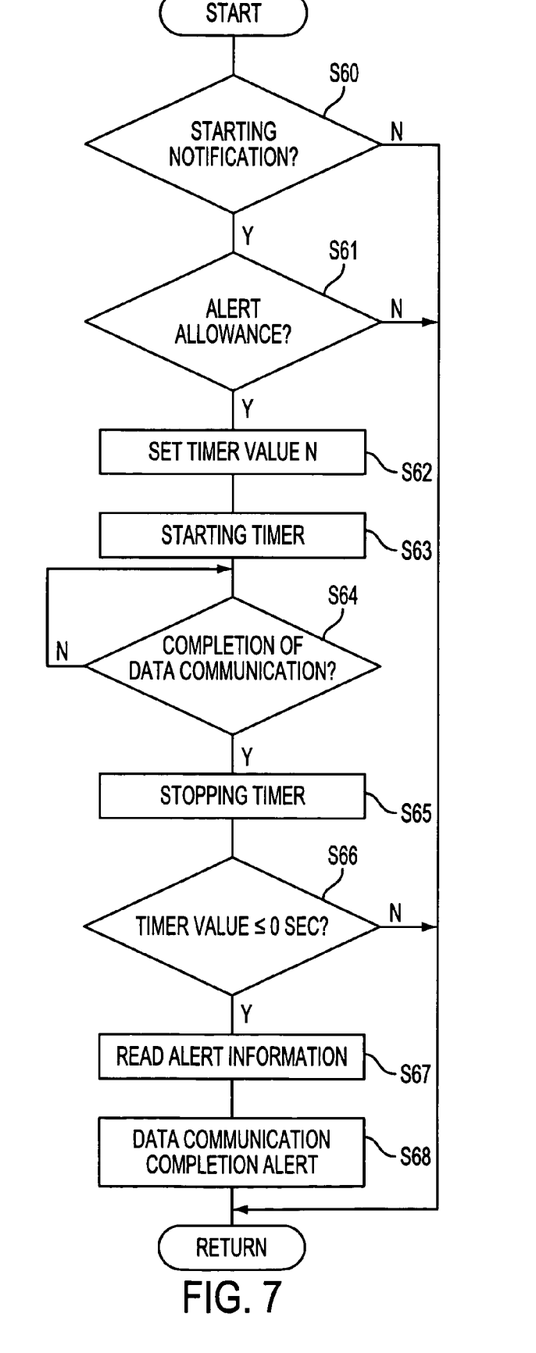
FIG. 7 is a flowchart illustrating an operation of the communication terminal according to the second embodiment of the present invention.

An operation of the controller 51 according to a control program stored in the memory 52 is shown in FIG. 7. The controller 51 monitors a starting notification of the data communications via a communication line connected to a server (not shown) on data communication networks (step S60: N). Content data to be communicated are stored in the server (not shown) The starting notification is generated from the line manager 20. When the starting notification is detected by the controller 51 (step S60: Y), it is determined whether a generation of a data communication completion alert is allowed upon the completion of the data communications in reference to alert setting information previously stored in the memory 52 (step S61). When it is determined that the generation of the alert is prohibited upon the completion of the data communications in reference to the alert setting information (step S61: N), another data communication starting notification from the line manager 20 is monitored again (Return).

When it is determined in step S61 that the generation of the alert is allowed upon the completion of the data communications (step S61: N), a timer value N seconds (N is a positive integer) is set to the timer 50 (step S62), and further, the timer 50 starts counting the timer value (step S63). In this manner, the timer 50 counts down the timer value for a predetermined time interval.

Subsequently, the controller 51 monitors a completion notification of the data communications in which the starting notification is performed in step S60 from the line manager 20 (step S64: N). The completion notification is also generated by the line manager 20. When the completion notification is detected (step S64: Y), the controller 51 stops the counting by the timer 50 (step S65). It is determined whether the timer value has counted down to zero seconds (step S66). If it is determined that the timer value of the timer 50 is equal to zero seconds (step S66: N), it is determined that the data communication time period is shorter than the threshold value N seconds. In this case, no data communication completion alert is generated, thereby monitoring another data communication starting notification from the line manager 20 again (Return).

In contrast, if it is determined in step S66 that the timer value of the timer 50 is zero seconds (step S66: Y), it is determined that the data communication period is longer than the threshold value N seconds. The line manger 20 acquires the content data received over the data communication networks.

The controller 51 executes a browser program stored in the memory 52 without data conversion when the acquired content data is text data, so as to display the content data on the LCD 24 via the LCD driver 25. To the contrary, when the acquired content data is binary data, the controller 51 converts the content data into content data in a text format described in the HTML. Thereafter, the controller 51 executes the browser program stored in the memory 52, to display the converted content data on the LCD 24 via the LCD driver 25.

A data communication completion alert information indicative of at least one of notification modes, such as some volume of a speaker's sound and a vibrator's vibration, previously stored in the memory 52 is read when it is determined that data communication time period is longer than the threshold value N (step S67). Thereafter, the data communication completion is notified according to the notification mode previously set by the user (step S68). Subsequently, another data communication starting notification from the line manager 20 is monitored again (Return).

It is assumed that 30 seconds is set as the timer value N of the timer 50 and the user previously sets the data communication completion alert information such that the output sound at a high volume is rung twice. If an access is made to the Internet and a time period spent for the reception of the content data is 30 seconds or longer, a output sound at the high volume is rung only twice by the speaker 21, thereby notifying the user of the data communication completion, and further, the received content data is displayed on the LCD 24. However, if the time period spent for the reception of the content data does not exceed 30 seconds, no data communication completion alert is generated.

Otherwise, it is assumed that 30 seconds is set as the timer value N of the timer 50 and the user previously sets vibration for 1 second as the data communication completion alert information. When an access is made to the Internet and a time period spent for the reception of the content data is 30 seconds or longer, the vibrator 22 is vibrated for only 1 second, thereby notifying the user of the data communication completion. Moreover, the received content data can be displayed on the LCD 24. However, if the time period spent for the reception of the content data does not exceed 30 seconds, no data communication completion alert is generated.

In the communication terminal according to the second embodiment, the user previously sets the data communication completion alert information indicative of the notification mode that is used for the data communication completion alert. After the starting of the data communications, the predetermined timer value is set in the timer 50, and then, the time counting is started. Upon the notification of the data communication completion from the line manager 20, if the timer value counted by the timer 50 is not zero seconds or shorter, no data communication completion alert is generated. In contrast, if the timer value is zero seconds or shorter, the user is notified of the data communication completion alert according to the previously set notification mode. Thus, even in the case of a small data communication quantity or in the event of network congestion due to some circumstances, it is possible to avoid a problem of the need of keeping a careful watch on the display screen until the completion of the data communication. It is possible to notify the completion of the data communication only when the time period of the data communications exceeds a predetermined time period, so as to prevent any useless generation of the data communication completion alert during the short data communications. Consequently, it is possible to notify the data communication completion alert according to the use environment of the user who uses the communication terminal. Moreover, since there is no need of description of a predetermined notification code in the content data for the data communication completion alert, it is possible to readily use the communication terminal according to the present invention in the existing Internet system.

As to the communication terminal according to the second embodiment, the timer value of the timer 50 is counted down from N seconds which is set at the starting of the data communications. However, the present invention is not limited to this communication terminal. The timer value of the timer 50 may be counted up from 0 seconds. After the notification of the completion of the data communications, the count result is compared with a predetermined threshold value. If the count result is smaller than the predetermined threshold value, no alert for the completion of the data communications is generated. To the contrary, if the count result is equal to or greater than the predetermined threshold value, a data communication completion alert is notified. At any rate, it is sufficient only to find the result of the comparison between the data communication time period and the predetermined threshold value.

Figure 10:
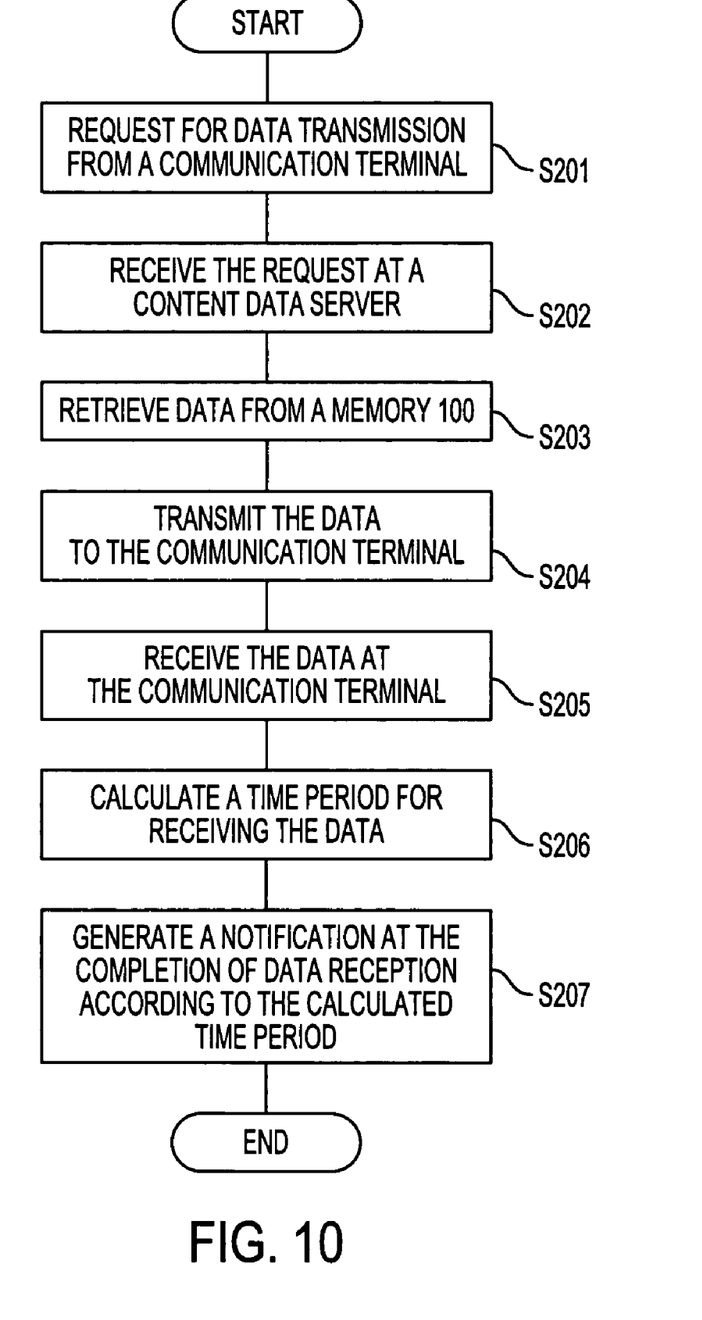
FIG. 10 is a flowchart showing an operation of a communication system with a communication terminal shown in FIG. 6 and a content data server according to the second embodiment of the present invention.

Next, an operation of communication systems with a communication terminal shown in FIG. 6 and a content data server will be discussed with reference to FIG. 10.

The communication terminal transmits a request signal to the content data server to transmit data (S201). When the request signal is received by the content data server (S202), the content data server retrieves data from the memory 100 (S203) and transmits the data (S204). The communication terminal receives the data (S205) and calculates a time period for receiving the data (S206). When the calculated time period for receiving the data is larger than a predetermined time period, the communication terminal generates a notification at the completion of data reception (S207).

(3) Third Embodiment

As to the communication terminal according to the first embodiment, the notification of the data communication completion alert is performed according to the notification mode previously set by the user when it is determined that the predetermined notification code is included in the received content data. However, the present invention is not limited to this communication terminal. For example, a corresponding notification mode on a side of a communication terminal is set in accordance with a predetermined notification code included in received content data, thereby the notification of the data communication completion alert is executed according to the set notification mode set in correspondence with the predetermined notification code.

Figure 8:
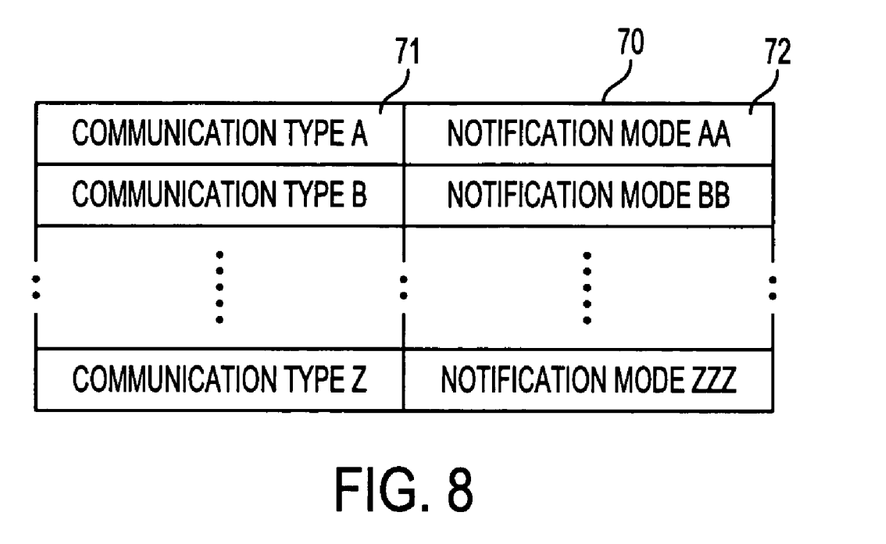
FIG. 8 illustrates a table showing call reception sound mode information used by a communication terminal according to a third embodiment of the present invention.

A configuration of data communication completion alert information used in a communication terminal according to a third embodiment of the present invention is shown in FIG. 8. A user previously sets a plurality of notification modes 72 designating a type of notification for each communication type 71. The communication type 71 is determined by a predetermined notification code included in a received content data. When it is determined that there is a predetermined notification code in the content data received in step S43 of FIG. 4, the notification mode 72 previously stored in a memory in such a manner as to correspond to the communication type 71 of the predetermined notification code. Based on the call reception setting information 72, data communication completion is notified by a speaker 21 and/or a vibrator 22.

For example, in FIG. 8, a communication type B corresponds to a predetermined notification code BBB. When there is the predetermined notification code BBB in a received content data, a data communication completion alert is notified according to a notification mode BB stored in association with the communication type B.

The user of the communication terminal is notified according to one of the previously set notification modes corresponding to the communication types, and therefore, the user can recognize the communication type wherein its data communication has completed based on a notification method performed according to the notification mode. In the case where a plurality of types of data communications are performed in sequence, the user can confirm which data communication has completed at the present.

The invention may be embodied in other specific forms without departing from the spirit or essential characteristics thereof. The embodiments of the present invention described here are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A communication system, comprising:
   a content data server that comprises:
      a storage unit that stores data;
      a communication unit that transmits the data based on request from a communication terminal; and
      a controller that converts the data such that a predetermined code is included in the data when an amount of the data to be transmitted to the communication terminal is larger than a predetermined amount; and
   a communication terminal that comprises:
      a receiver that receives the data transmitted from said content data server;
      a detector that detects the predetermined code included in the data; and
      a controller that generates a notification at the completion of data reception when the predetermined code is detected by said detector.

2. A method with a content data server and a communication terminal, the method comprising:
   requesting data transmission from the communication terminal to the content data server;
   retrieving data at the content data server according to the request from the communication terminal;
   converting the data at the content data server such that a predetermined code is included in the data when an amount of the data is larger than a predetermined amount;
   transmitting the data including the predetermined code from the content data server to the communication terminal;
   receiving the data including the predetermined code at the communication terminal;
   detecting the predetermined code at the communication terminal; and
   generating a notification at the completion of data reception when the predetermined code is detected.

3. A communication apparatus, comprising:
   a storage unit that stores data;
   a communication unit that transmits the data based on request from a communication terminal; and
   a controller that converts the data such that a predetermined code is included in the data when an amount of the data to be transmitted to the communication terminal is larger than a predetermined amount.

4. A method, comprising:
   receiving data; and
   generating a notification at the completion of data reception according to an amount of data received when the amount of the data is larger than a predetermined amount; and
   detecting a predetermined code that indicates that the amount of the data is larger than the predetermined amount, and generating the notification when the predetermined code is detected.

5. A communication terminal, comprising:
   a receiver that receives data;
   a controller that generates a notification at the completion of data reception according to the amount of data received when the amount of the data is larger than a predetermined amount; and
   an input unit that sets a notification prohibiting mode to said controller, whereby said controller does not generate the notification even if the amount of the data is larger than the predetermined amount.

6. The communication terminal as claimed in claim 5, further comprising:
   a storage unit that stores notification information indicative of a notification pattern for the notification.

7. The communication terminal as claimed in claim 6, wherein said controller generates the notification according to the notification information stored in said storage unit.

8. The communication terminal as claimed claim 5, wherein the data is described by one of a hypertext markup language, a handheld device markup language and a wireless markup language.

9. The communication terminal as claimed claim 5, further comprising:
   at least one of a speaker and a vibrator operated based on the notification generated from said controller.

10. The communication terminal as claimed claim 5, further comprising:
   a display unit that displays the data when the data has completely received by said receiver.

11. A communication terminal, comprising:
   a receiver that receives data;
   a detector that detects a predetermined code indicating that an amount of the data is larger than a predetermined amount; and
   a controller that generates a notification at the completion of data reception according to the amount of data received when said detector detects the predetermined code and the amount of the data is larger than the predetermined amount.

12. The communication terminal as claimed in claim 11, further comprising:
   an input unit that sets a notification prohibiting mode to said controller, whereby said controller does not generate the notification even though the predetermined code is detected.

13. The communication terminal as claimed in claim 11, further comprising:
   a storage unit that stores notification information indicative of a notification pattern for the notification.

14. The communication terminal as claimed in claim 13, wherein said controller generates the notification according to the information stored in said storage unit,
   wherein the information corresponds to the predetermined code detected by said detector.

15. The communication terminal as claimed in claim 14, wherein said storage unit that stores a plurality of notification patterns as the notification information,
   wherein each of the plurality of notification patterns is stored in association with the predetermined code.

16. The mobile communication terminal as claimed in claim 15, wherein said controller generates the notification with one of the plurality of notification patterns stored in said storage unit according to the predetermined code detected by said detector.

* * * * *